United States Patent
Iwata et al.

(10) Patent No.: US 8,757,313 B2
(45) Date of Patent: Jun. 24, 2014

(54) SADDLE TYPE VEHICLE

(75) Inventors: Masayuki Iwata, Saitama (JP); Manabu Fujii, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 416 days.

(21) Appl. No.: 13/071,613

(22) Filed: Mar. 25, 2011

(65) Prior Publication Data

US 2011/0240392 A1  Oct. 6, 2011

(30) Foreign Application Priority Data

Mar. 30, 2010  (JP) ................................. 2010-077890

(51) Int. Cl.
*B62M 7/06* (2006.01)
*B60K 11/04* (2006.01)
*B60K 11/08* (2006.01)

(52) U.S. Cl.
CPC ................. *B60K 11/04* (2013.01); *B60K 11/08* (2013.01)
USPC ............ 180/229; 165/41; 180/68.1; 180/68.4

(58) Field of Classification Search
USPC ............................ 180/229, 68.1, 68.4; 165/41
See application file for complete search history.

(56) References Cited

U.S. PATENT DOCUMENTS

| 4,537,273 | A | 8/1985 | Funabashi |
| 6,213,239 | B1 | 4/2001 | Onishi et al. |
| 6,695,089 | B2 * | 2/2004 | Adachi et al. ................. 180/311 |
| 7,284,508 | B2 * | 10/2007 | Dopke et al. ............... 123/41.56 |
| 7,448,461 | B2 * | 11/2008 | Misaki et al. ................. 180/68.4 |
| 2008/0236783 | A1 * | 10/2008 | Morita et al. ................... 165/41 |
| 2009/0218152 | A1 * | 9/2009 | Oohashi et al. .............. 180/68.3 |

FOREIGN PATENT DOCUMENTS

| EP | 1 108 585 A2 | 6/2001 |
| JP | 59-197796 A | 11/1984 |
| JP | 62-216890 A | 9/1987 |
| JP | 2002-37166 A | 2/2002 |
| JP | 2002-195036 A | 7/2002 |
| JP | 2009-235926 A | 10/2009 |

* cited by examiner

*Primary Examiner* — Tony Winner
*Assistant Examiner* — Jacob Knutson
(74) *Attorney, Agent, or Firm* — Birch, Stewart, Kolasch and Birch, LLP

(57) ABSTRACT

A saddle type vehicle includes a throttle body arranged while restraining the effect of the exhaust air of a radiator while restraining the vehicle width even though the radiator is large. A radiator includes a mixed flow fan which flows exhaust air from the radiator rearwardly and outwardly in the vehicle width direction and a motor configured to rotate the mixed flow fan on the back surface thereof. A throttle body is arranged rearwardly of the mixed flow fan so as to be overlapped with the mixed flow fan in a front view.

10 Claims, 7 Drawing Sheets

SADDLE TYPE VEHICLE

CROSS-REFERENCE TO RELATED APPLICATIONS

The present application claims priority under 35 USC 119 to Japanese Patent Application No. 2010-077890 filed on Mar. 30, 2010 the entire contents of which are hereby incorporated by reference.

BACKGROUND OF THE INVENTION

1. Field of the Invention

The present invention relates to a saddle type vehicle.

2. Description of Background Art

An automatic two-wheeled vehicle is known wherein a structure includes a water-cooled engine of a forward-tilted cylinder, a radiator disposed upward of a line extending along the front surface of a cylinder block of the engine in a side view, and with an air intake pipe having a throttle body, in which the radiator and the throttle body are arranged side by side. See, for example, JP-A-2002-037166. In this configuration, the throttle body having an electric element can be arranged so as not to be affected by exhaust air heated by the radiator.

However, in the configuration in which the radiator and an air intake pipe are arranged side by side, there arises a problem that if the capacity of the radiator is increased due to the increase of the displacement of the engine or the like, the size in the vehicle width direction is increased.

SUMMARY AND OBJECTS OF THE INVENTION

In view of such circumstances, it is an object of an embodiment of the present invention to provide a saddle type vehicle in which a throttle body can be arranged while restraining the effect of the exhaust air of the radiator while restraining the vehicle width even though the radiator is large.

In order to solve the above-described problem, according to an embodiment of the present invention a saddle type vehicle includes a vehicle body frame (2) having a head pipe (11) and a main frame (12) extending rearwardly from the head pipe (11). An engine (23) is provided having a cylinder portion (52) extending forward and upward obliquely from a crank case (51) at a position downward of the main frame (12). A radiator (59) is disposed in front of the cylinder portion (52) of the engine (23) with air intake pipes (61, 30) having a throttle body (30) for adjusting an air amount supplied to the engine (23) provided upward of the cylinder portion (52). The radiator (59) includes a mixed flow fan (323) for directing exhaust air from the radiator rearwardly and outwardly in the vehicle width direction and a motor (325) for rotating the mixed flow fan (323) disposed on a rear surface thereof, and the throttle body (30) is arranged rearwardly of the mixed flow fan (323) so as to overlap with the mixed flow fan (323) in a front view.

In this configuration, a radiator includes a mixed flow fan configured to direct the flow of the exhaust air from the radiator rearwardly and outwardly in the vehicle width direction, and a motor configured to rotate the mixed flow fan. A throttle body is arranged rearwardly of the mixed flow fan so as to overlap with the mixed flow fan in a front view. Therefore, the exhaust air from the radiator can hardly hit on the throttle body by the mixed flow fan. Even though the radiator is upsized, the throttle body can be arranged while restraining the effect of the exhaust air from the radiator.

In the configuration as described above, the engine (23) is a parallel multi-cylinder engine having a single air-inlet port (52F) to which the air intake pipes (61, 30) are connected, and a branch intake air passage (52R) branched from the air-inlet port (52F) to a plurality of cylinders is also applicable. In this configuration, the width of the throttle body of the parallel multi-cylinder engine can be reduced, and the exhaust air rearwardly of the radiator can be directed to flow easily, so that the thermal effect on the throttle body can further be restrained.

In the configuration described above, the radiator (59) is overlapped with a cylinder head cover (52C) at a front end of the cylinder portion (52) in a front view, and the mixed flow fan (323) is arranged at a position offset from a vehicle width center to one side in the vehicle width direction, and a slant surface (372) inclined rearwardly is provided on one side of the cylinder head cover 52C in the vehicle width direction is also applicable. In this configuration, even with the structure in which the cylinder head cover is arranged rearwardly of the radiator, an ease of flow of the exhaust air from the radiator can be enhanced by the slant surface, whereby the thermal effect on the throttle body can be restrained.

A vane on the one side of the mixed flow fan (323) in the vehicle width direction and the slant surface (372) of the cylinder head cover (52C) may be arranged within the same width in the vehicle width direction. In this configuration, the exhaust air from the radiator can flow efficiently, whereby the thermal effect on the throttle body can be restrained.

In the configuration as described above, the air intake pipes (61, 30) may extend forward and upward obliquely from the cylinder portion (52) and upper ends thereof may be connected to an air cleaner (24) arranged upward of the radiator (59). In this configuration, the air intake pipes can be arranged compactly in a space surrounded by the cylinder portion, the radiator, and the air cleaner.

The radiator (59) may be arranged astride forward of the air intake pipes (61, 30) and forward of the cylinder portion (52), and the radiator (59) may be arranged at an angle of inclination less than the angles of inclination of the air intake pipes (61, 30) in a side view. According to this configuration, the radiator can be arranged so as to use the front space between the air intake pipe and the cylinder portion as much as possible.

Also, in the configuration, the radiator (59) may be arranged above a line (L11) extending along a front surface of a cylinder block (52A) of the engine (23). In this configuration, the radiator may be arranged at a position higher than the cylinder block, thereby easily being protected from getting wet by water or the like from the front wheel side.

According to an embodiment of the present invention, a saddle type vehicle includes a vehicle body frame having a head pipe and a main frame extending rearwardly from the head pipe with an engine having a cylinder portion extending forward and upward obliquely from a crank case at a position downward of the main frame. A radiator is disposed in front of the cylinder portion of the engine with air intake pipes having a throttle body for adjusting air supply to the engine provided upward of the cylinder portion, wherein the radiator includes a mixed flow fan for directing a flow of exhaust air from the radiator rearwardly and outwardly in the vehicle width direction and a motor for rotating the mixed flow fan disposed on a rear surface thereof. The throttle body is arranged rearwardly of the mixed flow fan so as to be overlapped with the mixed flow fan in a front view. Therefore, even when the radiator is upsized, the throttle body can be arranged while restraining the effect of the exhaust air from the radiator.

By employing the parallel multi-cylinder engine having a single air-inlet port to which the air intake pipes is connected and a branch intake air passage branched from the air-inlet port to a plurality of cylinders as the engine, the width of the throttle body of the parallel multi-cylinder engine can be reduced, and the exhaust air rearwardly of the radiator can flow easily, so that the thermal effect on the throttle body can further be restrained.

With the configuration in which the radiator is overlapped with a cylinder head cover at a front end of the cylinder portion in front view, the mixed flow fan is arranged at a position offset from a vehicle width center to one side in the vehicle width direction, and a slant surface inclined rearwardly is provided on one side of the cylinder head cover in the vehicle width direction. Even with a structure in which the cylinder head cover is arranged rearwardly of the radiator, the thermal effect of the throttle body can be restrained by the slant surface.

Furthermore, with the configuration in which a vane on the one side of the mixed flow fan in the vehicle with direction and the slant surface of the cylinder head cover are arranged within the same width in the vehicle width direction, the exhaust air from the radiator can flow efficiently, whereby the thermal effect on the throttle body can be restrained.

With the configuration in which the air intake pipes extends forward and upward obliquely from the cylinder portion, and upper ends thereof are connected to the air cleaner arranged upward of the radiator, the air intake pipes can be arranged compactly in a space surrounded by the cylinder portion, the radiator, and the air cleaner.

With the configuration in which the radiator is arranged astride forward of the air intake pipes and forward of the cylinder portion and the radiator is arranged at an angle of inclination less than angles of inclination of the air intake pipes in a side view, the radiator can be arranged so as to use the front space between the air intake pipe and the cylinder portion as much as possible.

Also, by arranging the radiator upward of a line extending along a front surface of a cylinder block of the engine, the radiator can easily be protected from getting wet by water or the like from the front wheel side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
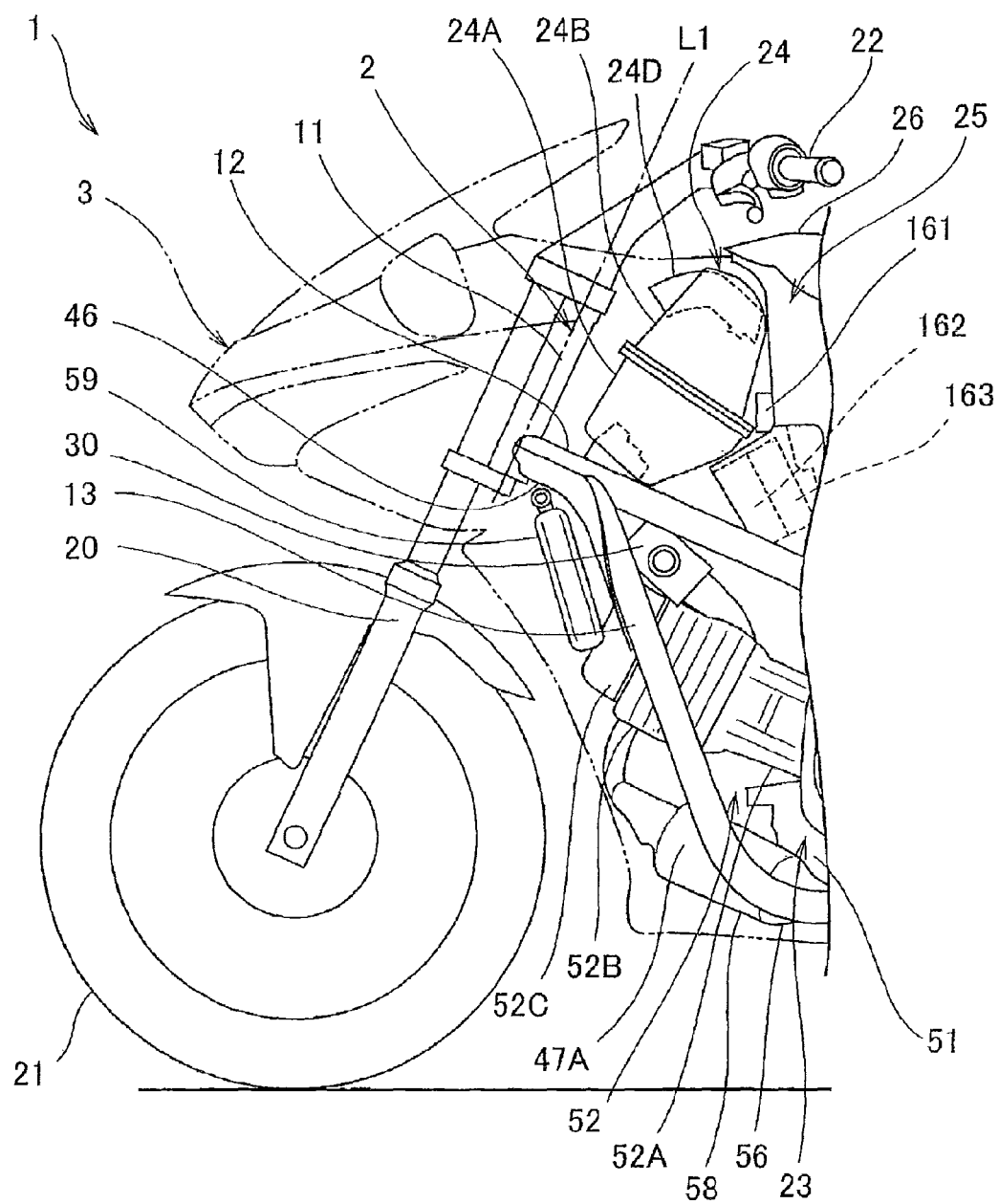
FIG. 1 is a left side view of an automatic two-wheeled vehicle according to an embodiment of the present invention.

Referring now to the drawings, an embodiment of the present invention will be described. In the description, expressions such as front, rear, left, right, up and down are the same as the directions with respect to the vehicle body unless otherwise specifically mentioned.

FIG. 1 is a drawing of a front portion of an automatic two-wheeled vehicle 1 according to the embodiment of the present invention viewed from the left side.

A vehicle body frame 2 of the automatic two-wheeled vehicle 1 is formed by connecting a plurality of types of metallic components integrally by welding or the like, and includes a head pipe 11, a pair of left and right main frames 12 extending rearwardly and downwardly from the head pipe 11, and a pair of left and right down frames (also referred to as a "cradle frame") 13 extending downward from the main frames 12 and supporting a front end portion of an engine 23. Rear end portions of the main frames 12 and rear end portions of the down frames 13 are coupled to a pair of left and right pivot frames (not shown). Reference sign L1 in the drawings designates an axial line of the head pipe 11, which matches an axial line of a steering shaft inserted through the head pipe 11.

The head pipe 11, the main frames 12, and the down frames 13 are made up of metallic pipes formed of metallic material such as steel material or the like. In FIG. 1, a vehicle body cowl 3 covers the vehicle body frame 2, a center stand 4 is provided for parking the vehicle body on the ground in a vertical position, and a side stand 5 is provided for parking the vehicle body in a state of being inclined leftward.

The head pipe 11 is arranged so as to incline rearwardly and upwardly from a widthwise center of the front portion of the vehicle, and supports a pair of left and right front forks 20 (see FIG. 1) so as to be steerable in the left and right direction. A front wheel 21 is rotatably supported at lower portions of the front forks 20 and a steering handle 22 is supported on an upper portion of the front forks 20. In other words, the head pipe 11 supports a steering device which constitutes a steering system of the automatic two-wheeled vehicle 1.

The pair of left and right main frames 12 extend from the left and right of a lower portion of the head pipe 11 so as to be inclined rearwardly and downwardly in side view, and extends rearwardly so as to broaden outwardly in the vehicle width direction, and rear ends thereof are coupled to front upper portions of left and right pivot frames 14.

The left and right main frames 12 are frames configured to support the engine 23 as an internal combustion engine, an air cleaner 24, a storage box 25, and so on. The air cleaner 24 is supported above front portions of the left and right main frames 12 in a position inclined in parallel to the axial line L1 of the head pipe 11 upwardly and rearwardly, includes an air cleaner lower case 24A opening rearwardly and upwardly, and an air cleaner upper cover 24B covering an opening surface of the air cleaner lower case 24A, and the air cleaner upper cover 24B includes a duct 24D for introducing the outside air.

The storage box 25 is supported rearwardly of the air cleaner 24 above rear portions of the left and right main frames 12, and rotatably supports a lid member 26 configured to cover an upper opening of the storage box 25 so as to be openable and closable.

The engine 23 is supported downwardly of the left and right main frames 12, rearwardly of the left and right down frames 13, and forwardly of the pivot frames 14, thereby being suspended in the vehicle body frame 2 at a lower center in the fore and aft direction.

The automatic two-wheeled vehicle 1 includes the engine 23 disposed at the lower center of the vehicle body frame 2 in the fore-and-aft direction, and the high-capacity storage box 25 disposed upward of the engine 23. Therefore, relatively heavy components (the engine 23 and the storage box 25 having items loaded therein) can be disposed at the center in the fore-and-aft direction of the vehicle, so that the concentration of the mass is achieved.

The left and right down frames 13 extend linearly downwardly from main frame front portions 12F, and then are bent rearwardly and coupled to the pivot frames (not shown).

A single gusset plate 46 is provided on a portion from the lower portion of the head pipe 11 to the down frames 13, which is a front lower portion of the vehicle body frame 2. The gusset plate 46 is a substantially U-shaped metallic plate-shaped component extending from the head pipe 11 to the pair of left and right down frames 13, and configured to cover a coupled portion between the head pipe 11 and the main frames 12, and a coupled portion between the main frames 12 and the down frames 13 from below, so that the respective coupled portions are reinforced to enhance the rigidity of the vehicle body frame 2.

Figure 2:
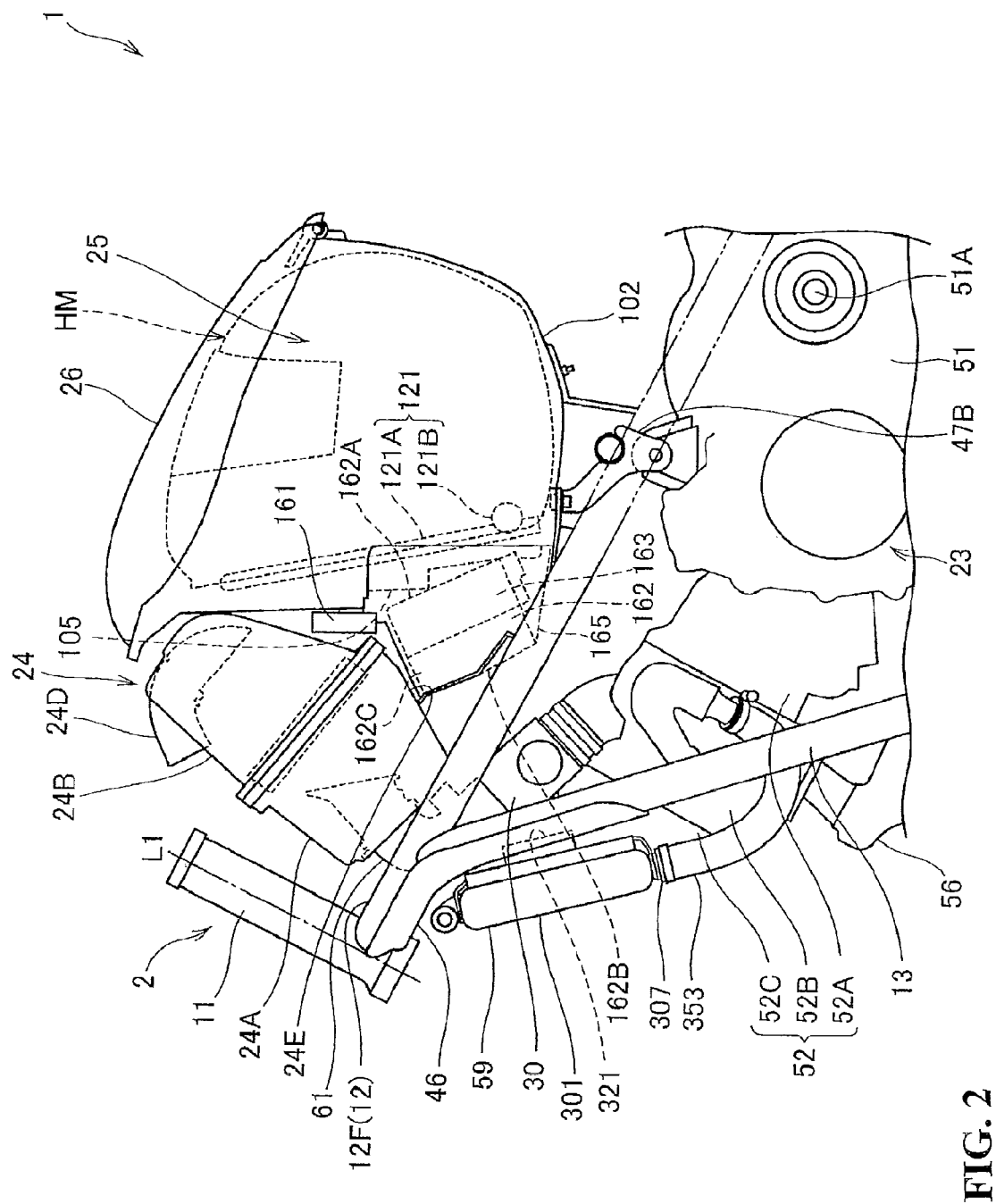
FIG. 2 is a drawing of a configuration of a periphery of an engine viewed from the left side of a vehicle body.
Figure 3:
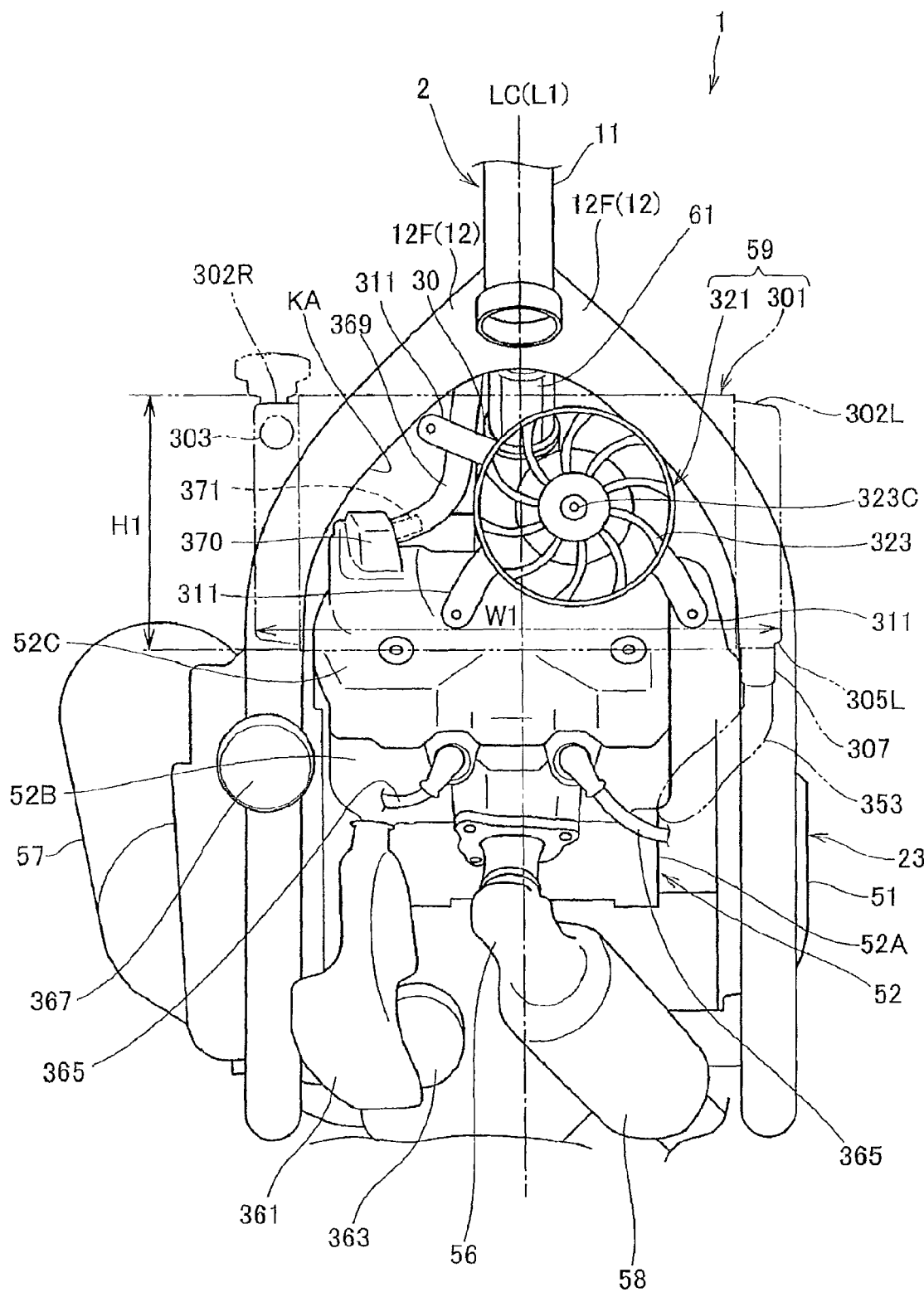
FIG. 3 is a drawing of the configuration of the periphery of the engine viewed from the front.
Figure 4:
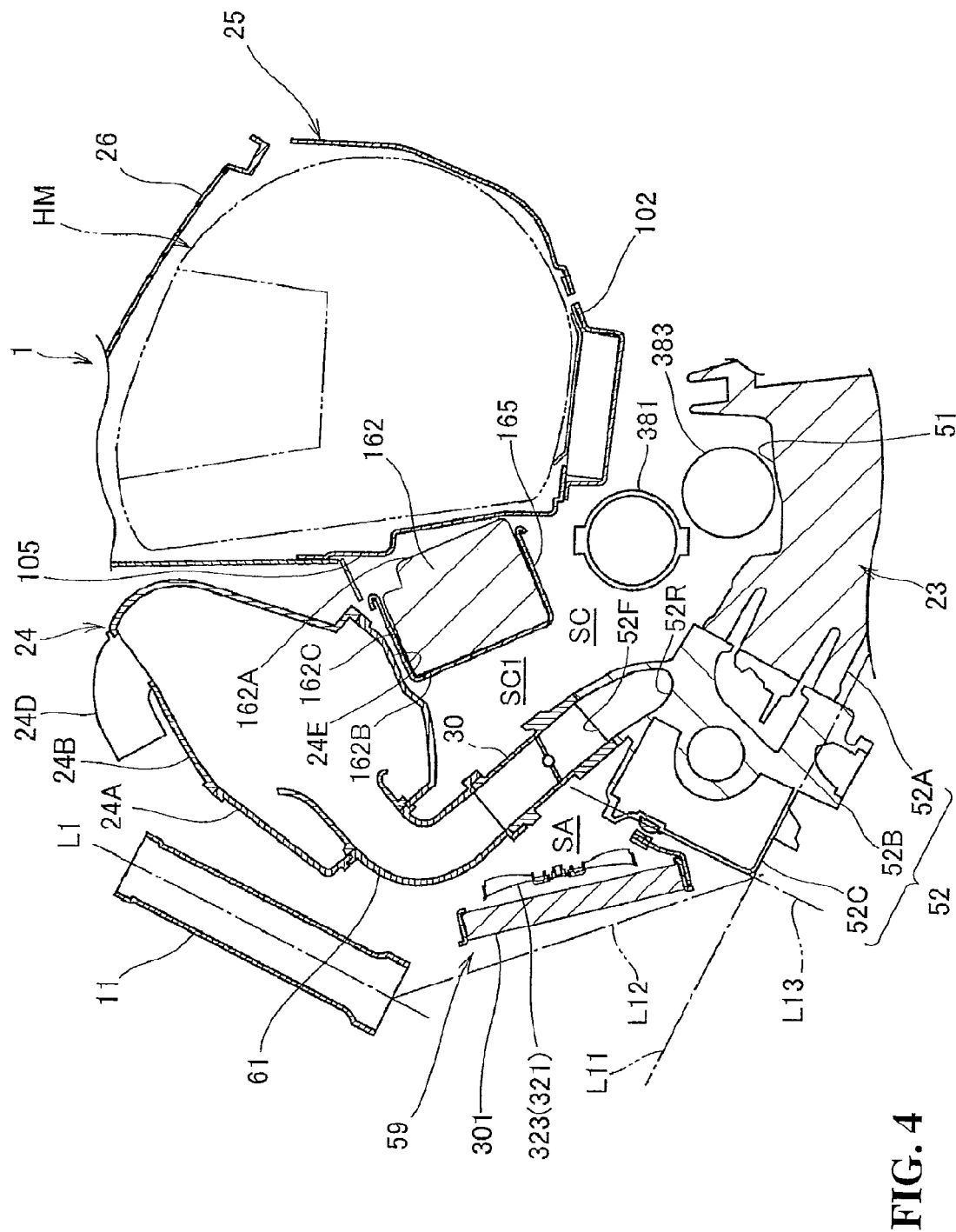
FIG. 4 is a cross-sectional side view of the peripheral configuration of the engine taken along the widthwise center of the vehicle.
Figure 5:
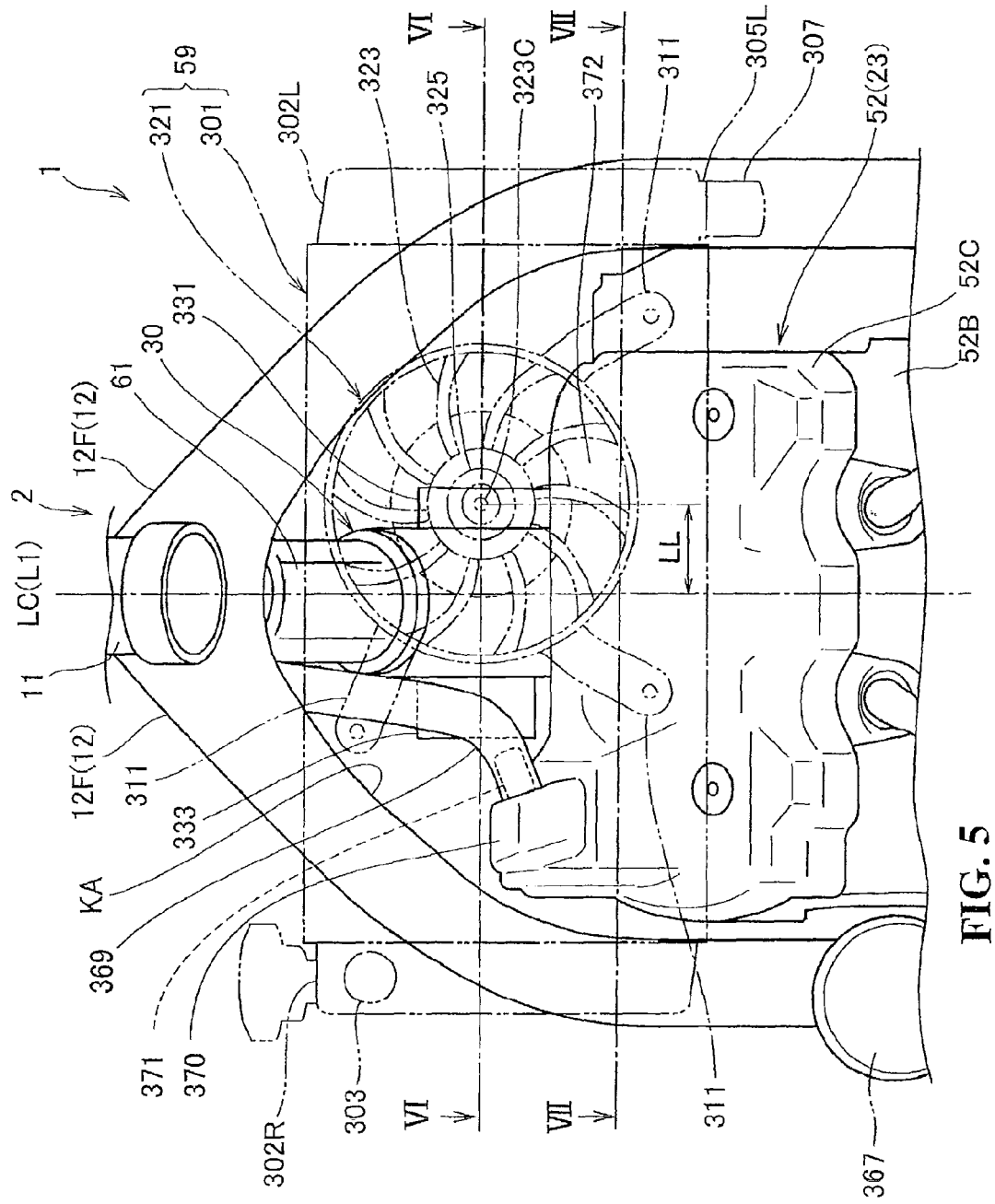
FIG. 5 is a drawing showing a front upper portion of the engine shown together with the peripheral configuration.

FIG. 2 is a drawing of a configuration in a periphery of the engine viewed from the left side of the vehicle body, FIG. 3 is a drawing of the same viewed from the front, and FIG. 4 is a cross-sectional side view taken along a width center LC of the vehicle 1. FIG. 5 is a drawing of an upper front portion of the engine shown together with the peripheral configuration. In FIG. 2, the reference sign HM designates a helmet stored in the storage box 25. A U-shape lock 121 is stored in the storage box 25. The U-shaped lock 121 is an anti-theft product having a U-shaped arm 121A and a lock bar 121B which can lock an opening-side side end portion of the U-shaped arm 121A.

The engine 23 is a forward-tilted engine having a cylinder portion 52 extending from a front upper portion of a crankcase 51 so as to be tilted forwardly and upwardly, and is a parallel multi-cylinder (parallel two-cylinder) four-cycle engine having a plurality of (two in this configuration) cylinders arranged in a line in the vehicle width direction.

As shown in FIG. 2, the engine 23 is supported in such a manner that a front portion of the crankcase 51 is supported by the down frames 13 via engine hangers (not shown), an upper portion of the crankcase 51 is supported by the main frames 12 via engine hangers 47B, and a rear portion of the crankcase 51 is supported on the side of the pivot frame, whereby the engine 23 is supported by the vehicle body frame 2 with the cylinder axis inclined toward the front.

The crankcase 51 extends in the left and right main frames 12 under the storage box 25 in the fore-and-aft direction, and an engine output shaft 51A is disposed on a rear portion of the crankcase 51 on the left side thereof. The engine output shaft 51A and a rear wheel which is not shown are coupled so as to be capable of transmitting power via a drive chain (referred to as "chain"), and the power of the engine 23 is transmitted to the rear wheel via the chain.

The cylinder portion 52 includes a cylinder block 52A coupled to the front upper portion of the crankcase 51, a cylinder head 52B coupled to an upper portion of the cylinder block 52A, and a cylinder head cover 52C covering an upper portion of the cylinder head 52B, and is arranged in the left and right main frames 12 at a position downward of the air cleaner 24.

A single throttle body 30 for adjusting the amount of air supplied to the engine 23 is coupled to a rear upper surface of the cylinder head 52B. The throttle body 30 extends forwardly and upwardly from a single air-inlet port 52F (see FIG. 4) provided on the cylinder portion 52, and a forward end portion thereof is connected to the air cleaner lower case 24A via a connecting tube 61.

In other words, in this embodiment, air intake pipes (the connecting tube 61, the throttle body 30) connecting an front upper portion of the cylinder portion 52 and the air cleaner lower case 24A are positioned above the cylinder portion 52, extending forwardly and upwardly from the cylinder head 52B as part of the cylinder portion 52, and are connected to the air cleaner 24 at upper ends thereof.

Since the engine 23 is a parallel multi-cylinder engine, the plurality of cylinders (two cylinders in this configuration) are formed and arranged in the cylinder portion 52 in a line in the vehicle width direction, and branch intake air passages 52R (see FIG. 7, described later) branched from the single air-inlet port 52F by a number corresponding to the number of the cylinders are formed, so that the engine 23 is in communication with the respective cylinders via the branch intake air passages 52R.

Since the cylinder portion 52 is the forward-tilted cylinder tilting upwardly toward the front, the front upper portion of the cylinder portion 52 is in proximity to the air cleaner 24 at a position downwardly thereof, so that the air intake pipes (the connecting tube 61, the throttle body 30) connecting the front upper portion of the cylinder portion 52 and the air cleaner lower case 24A can be shortened. The air intake pipes which connect the front upper portion of the cylinder portion 52 and the air cleaner lower case 24A are provided in spaces between the engine 23 and the main frames 12.

As shown in FIG. 2 and FIG. 3, an exhaust pipe 56 is connected to a lower surface of the cylinder head 52B, and the exhaust pipe 56 extends to a left side, which is one side in the vehicle width direction, and rearwardly and downwardly from the cylinder head 52B, then is bent rearwardly and substantially horizontally, extends rearwardly through a left side of crankcase 51, extends to a right side, which is the other side in the vehicle width direction, between the engine 23 and a rear wheel 27, and is connected to a muffler 57. An engine exhaust system is made up of the exhaust pipe 56 and the muffler 57.

A catalytic converter 58 is provided at a midpoint of the exhaust pipe 56. More specifically, the catalytic converter 58 is provided in the vicinity of an inlet port of the exhaust pipe 56 (in the vicinity of the cylinder portion 52) at a position downwardly of the cylinder portion 52 on the left side. Therefore, the catalytic converter 58 receives a supply of high-temperature exhaust gas immediately after having been exhausted from the cylinder portion 52, and is subjected to heat discharge from the cylinder portion, so that the catalyst temperature can be increased quickly to an activated temperature.

As shown in FIG. 2, the engine 23 of the automatic two-wheeled vehicle 1 is a water-cooled engine, and includes a radiator 59 for cooling engine cooling water circulating in the engine 23, and the radiator 59 is supported by the vehicle body frame 2 (the down frames 13) at a position forward of the cylinder portion 52.

The radiator 59 is supported by a radiator supporting stay (see FIG. 3) provided in the vicinity of the rear lower portion of the head pipe 11, is arranged forward of the pair of left and right down frames 13 and at an inclination rearwardly and downwardly along the down frame 13. As shown in FIG. 4, the radiator 59 is arranged within a free space SA formed upwardly of a line L11 extending along a front surface of the cylinder block 52A, rearwardly of a line L12 connecting a front lower edge of the cylinder head cover 52C and a lower end of the head pipe 11 and forward of a line L13 extending along a top surface of the cylinder head cover 52C in side view.

In this case, the radiator 59 is arranged astride forward of the air intake pipes (the connecting tube 61, the throttle body 30) and forward of the cylinder portion 52, and is arranged at an angle of inclination thereof less than angles of inclination of the air intake pipes in a side view, so that the radiator 59 can be arranged so as to use a front space between the air intake pipes and the cylinder portion 52 as much as possible.

As shown in FIG. 3, the radiator 59 includes a radiator body 301 of a fin tube-type heat exchanger which allows passage of a flow of air from the front of the vehicle body, and an air blower 321 to be attached to a back surface of the radiator body 301 via a bracket 311.

The radiator body 301 has a wide parallelepiped shape having a width (lateral length) W1 longer than a vertical length H1, and is formed to have the vertical length H1 corresponding to a length between the main frame front portion 12F and the cylinder portion 52 and the width W1 corresponding to the substantially same length as the maximum width (the maximum width of the left and right down frames 13) in a front portion of the vehicle body frame 2, thereby being formed into a large-capacity radiator.

The radiator body 301 is arranged so that the lateral center thereof is aligned with the vehicle width center LC of the vehicle 1, and covers an opening portion formed between the vehicle body frame 2 and the engine 23 in front view of the vehicle. More specifically, a substantially triangular opening portion KA is formed between the left and right down frames 13 and the cylinder portion 52 of the engine 23 substantially completely from the front.

In this configuration, as shown in FIG. 3, left and right upper corners 302L, 302R of the radiator body 301 protrude outward of the triangular opening portion KA. An inlet side hose connecting port 303 is provided on a back surface of one (right) of the left and right upper corners 302L, 302R. Accordingly, a radiator upper hose (not shown) is configured to be attachable and detachable easily from behind the radiator body 301.

The radiator body 301 is also provided with an outlet side hose connecting port 307 at a lower corner 305L on the other side (left side) positioned at a corner opposing the upper corner 302R having the inlet side hose connecting port 303. A radiator lower hose 353 extends from the engine 23 from the same side as the outlet side hose connecting port 307, and the radiator lower hose 353 can be connected to the radiator body 301 at a short distance.

Therefore, the cooling water increased in temperature by cooling down the engine 23 is supplied to the radiator body 301 through the radiator upper hose by the driving of a water pump (not shown) in the engine 23, exchanges heat with the outside air in the radiator body 301, and then is returned to the engine 23 through the radiator lower hose 353, whereby a water cooling system which cools down the engine 23 is configured.

As shown in FIG. 3, the reserve tank 361 of the radiator 59 is disposed downward of the cylinder portion 52. The reserve tank 361 is disposed at a position to the right, which corresponds to the other side in the vehicle width direction. By arranging the reserve tank 361 at a position to the right, the large sized reserve tank 361 can be arranged using the free space downward of the cylinder portion 52 and on the other side of the exhaust pipe 56 in the vehicle width direction.

In FIG. 3, an oil filter 363 is provided on a front surface of the crankcase 51, a pair of plug cords 365 is connected respectively to ignition plugs (not shown) disposed in the respective cylinders of the cylinder portion 52 of the engine 23, and a horn 367 outputs an alarm sound.

The pair of plug cords 365 are positioned downwardly of the radiator 59 in a front view. Therefore, the radiator 59 does not hinder access to the respective plug cords 365, so that easy access to the plug cords 365 or the ignition plugs is achieved.

In addition, in the automatic two-wheeled vehicle 1, the throttle body 30 is coupled to an upper surface of the cylinder portion 52 of the parallel multi-cylinder engine 23, and the radiator 59 is arranged forwardly and upwardly of the cylinder portion 52 so as to extend in the vehicle width direction, so that the throttle body 30 is disposed rearwardly of the radiator 59.

As shown in FIG. 5, since the throttle body 30 includes a throttle drum 331 to which a throttle cable is connected and a sensor unit 333 including electric components such as sensors for detecting throttle openings, intake air temperatures, intake air pressures, and so on, it is desired to protect the throttle body 30 from being affected by exhaust air heated by the radiator 59 (referred to as "exhaust air from the radiator").

Therefore, in this configuration, the throttle body 30 and the air blower 321 to be provided in the radiator 59 provided forward of the throttle body 30 are disposed so as to overlap with each other in front view.

Figure 6:
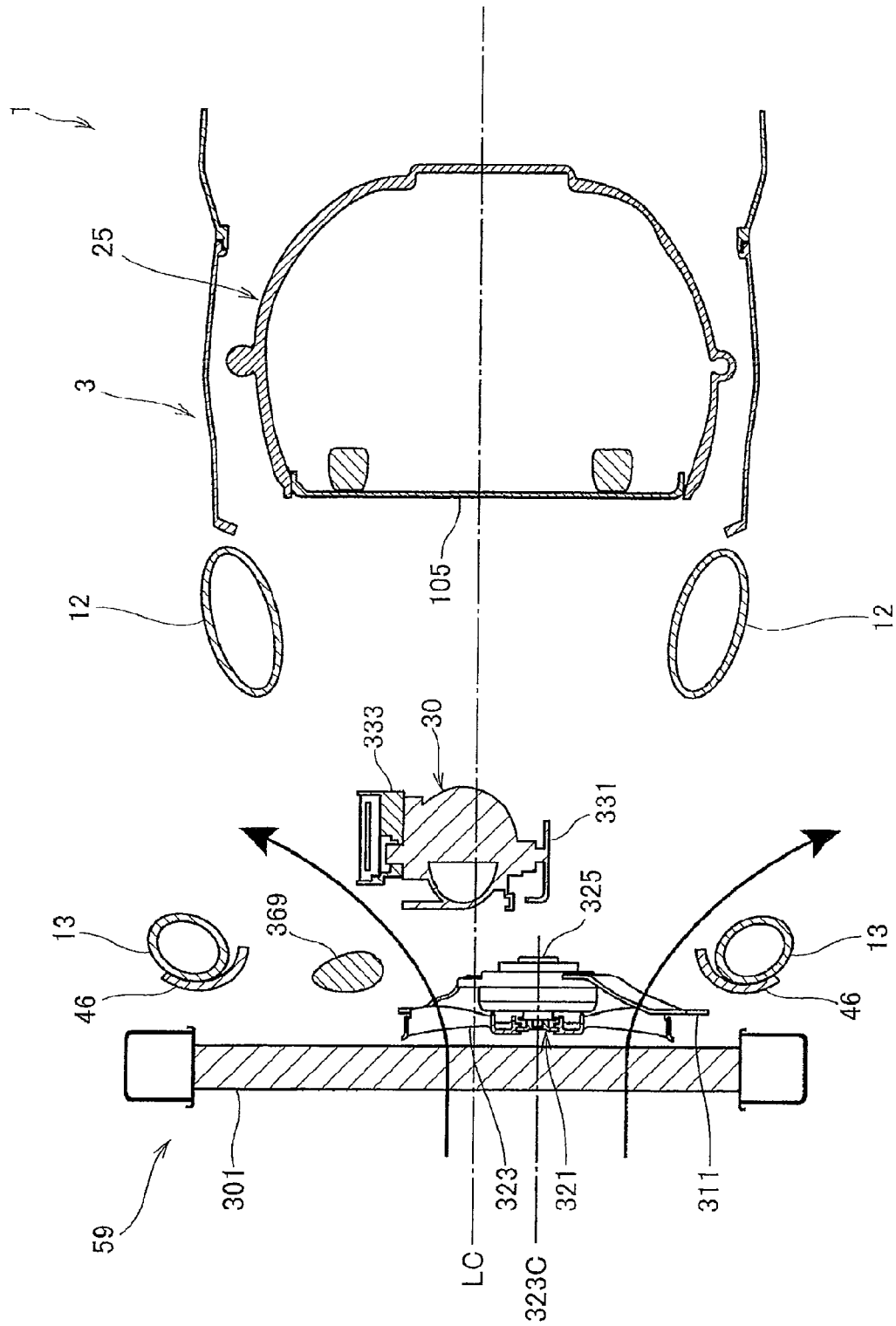
FIG. 6 is a cross-sectional view taken along the line VI-VI in FIG. 5.
Figure 7:
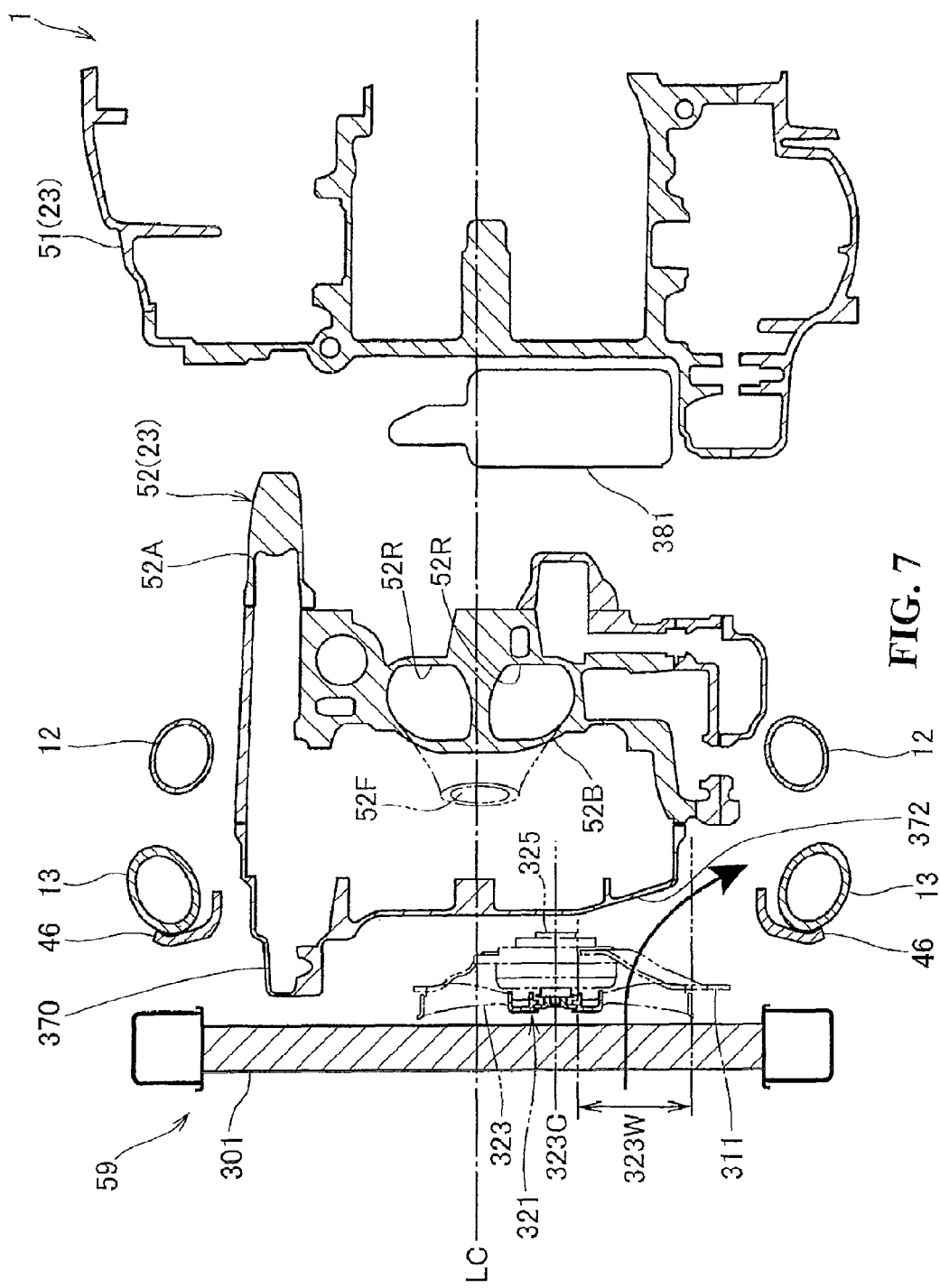
FIG. 7 is a cross-sectional view taken along the line VII-VII in FIG. 5.

FIG. 6 is a cross-sectional view taken along the line VI-VI in FIG. 5, and FIG. 7 is a cross-sectional view taken along the line VII-VII in FIG. 5. In FIG. 7, although the air blower 321 appears little in the cross-section taken along the line VII-VII in FIG. 5, the air blower 321 is shown by alternate long and two short dashed lines to show the position in the fore-and-aft direction and the position in the lateral direction of the air blower 321.

As shown in FIG. 5 to FIG. 7, the air blower 321 includes a mixed flow fan 323 as a cooling fan, and a drive motor 325 which rotates the mixed flow fan 323, and air is forcedly passed through the radiator body 301 by rotating the mixed flow fan 323 by the drive motor 325, so that the cooling efficiency of the radiator 59 is secured even when the vehicle is stopped.

The mixed flow fan 323 is a fan classified in a category between an axial flow fan and a centrifugal fan, and an angle formed by the direction of inflow of fluid and the direction of outflow of the fluid is an obtuse angle. The mixed flow fan 323 is a fan configured to form a flow of air by taking air in front of the mixed flow fan 323 and letting the air flow rearward obliquely from the mixed flow fan 323 (shown by arrows in FIG. 6 and FIG. 7), whereby the flow of air through the radiator 59 is formed and the exhaust air from the radiator can flow outwardly in the vehicle width direction.

As shown in FIG. 5, the mixed flow fan 323 has a circular fan shape, and is arranged at a position overlapped with the throttle body 30 in front view.

More specifically, the mixed flow fan 323 is arranged in such a manner that a rotation center 323C thereof is aligned at a vertical midpoint of the opening portion KA formed between the vehicle body frame 2 and the engine 23 in a front view and shifted to a position offset from the vehicle width center LC of the vehicle 1 toward the left, which is one side in the vehicle width direction, by a value LL.

The mixed flow fan 323 is a large-diameter fan which can cover the throttle body 30 exposed between the cylinder portion 52 and the connecting tube 61 substantially entirely in a state of being offset in the vehicle width direction.

In this configuration, since the mixed flow fan 323 is positioned in the opening portion KA formed between the vehicle body frame 2 and the engine 23 in a front view, the exhaust air from the mixed flow fan 323 can easily be exhausted without being hindered by the vehicle body frame 2 and the engine 23.

As shown in FIG. 5, a relatively large-diameter hose member 369 is arranged so as to extend vertically in the vicinity of the radiator 59 rearwardly thereof, and the hose member 369 is arranged on the side opposite from the side where the mixed flow fan 323 is offset in the vehicle width direction.

In this manner, since the mixed flow fan 323 is positioned on the opposite side from the hose member 369 in the vehicle width direction, the mixed flow fan 323 can be positioned between the hose member 369 and the left vehicle body frame 2 (the down frame 13) apart from the hose member 369. Therefore, the mixed flow fan 323 and the hose member 369 can be arranged apart from each other, and the exhaust air from the mixed flow fan 323 can easily be exhausted without being hindered by the hose member 369.

The hose member 369 is a return hose which constitutes part of a blow-by gas passage. More specifically, the hose member 369 is connected at one end (lower end) thereof to an front upper surface of the cylinder portion 52 of the engine 23, that is, to a hose connecting port 371 of a hose connecting portion 370 provided on the right side of a front upper surface of the cylinder head cover 52C, and is coupled at the other end (upper end) thereof to the connecting tube 61 positioned upwardly thereof, whereby a passage for allowing the blow-by gas in the engine 23 to flow toward an engine inlet system is formed.

In this configuration, since a free space is formed between the hose connecting portion 370 and the mixed flow fan 323, an easy access to the hose connecting portion 370 is achieved, so that mounting and demounting of the hose member 369 can be easily performed.

As shown in FIG. 6, the throttle body 30 is arranged in such a manner that the axial line (which corresponds to the axial line of the air-intake channel) is aligned with the vehicle width center LC of the vehicle 1. The throttle body 30 integrally includes the throttle drum 331 on the left side, which is one side in the vehicle width direction, and integrally includes a sensor unit 333 which includes the electric components such as the sensor on the right side, which is the other side in the vehicle width direction.

As shown in FIG. 6, since the throttle body 30 is arranged rearwardly of the mixed flow fan 323, when the mixed flow fan 323 is not driven, the exhaust air from the radiator is blocked by the mixed flow fan 323, the drive motor 325, and the bracket 311, and hence is prevented from hitting easily on the throttle body 30 (including the sensor unit 333). When the mixed flow fan 323 is driven as well, the exhaust air from the mixed flow fan 323 does not flow toward the throttle body 30, and hence is prevented from hitting easily on the throttle body 30.

In this case, as shown in FIG. 6, the exhaust air from the radiator coming from the front of the throttle body 30 is branched to the left and right by the air blower 321 including the mixed flow fan, and flows rearwardly and outwardly on the left and right of the throttle body 30. Then, the exhaust air from the radiator flowing rearwardly and outwardly on the left and right of the throttle body 30 is exhausted smoothly through the spaces between the down frames 13 and the main frames 12 to the outside of the vehicle.

In other words, in this configuration, the down frames 13 are positioned on the left and right with reference to the mixed flow fan 323, the throttle body 30 is positioned rearwardly thereof, and the main frames 12 are positioned rearwardly thereof on the left and right. Therefore, the exhaust air from the radiator is prevented from easily hitting on the throttle body 30, and can flow smoothly to the outside of the vehicle in either cases where the mixed flow fan 323 is not driven or driven.

Furthermore, in this configuration, the cylinder head cover 52C is provided with a slant surface (inclined surface) 372 inclined rearwardly as it goes outwardly in the vehicle width direction on one side (left side) in the vehicle width direction, which corresponds to the offset direction of the mixed flow fan 323 as shown in FIG. 7.

The slant surface 372 is formed on the front upper surface of the cylinder head cover 52C on one side in the vehicle width direction with respect to the rotation center 323C of the mixed flow fan 323. Therefore, the exhaust air from the radiator flowing on one side in the vehicle width direction with respect to the rotation center 323C of the mixed flow fan 323 can be guided smoothly outwardly in the one side in the vehicle width direction by the slant surface 372. Therefore, the exhaust air from the radiator toward the throttle body 30 can be reduced also by the slant surface 372, and the thermal effect on the throttle body 30 can further be restrained.

The slant surface 372 is formed within the same width as a width 323W of a vane on the one side of the mixed flow fan 323 in the vehicle width direction as shown in FIG. 7, and is provided at a position overlapping partly with the vane on the one side of the mixed flow fan 323 in the vehicle width direction in front view as shown in FIG. 5.

Therefore, the exhaust air from the radiator directed toward the throttle body 30 can be reduced effectively both by the vane on the one side of the mixed flow fan 323 in the vehicle width direction and the slant surface 372 when the mixed flow fan 323 is not driven, and the exhaust air from the mixed flow fan 323 can flow smoothly outwardly in the vehicle width direction along the slant surface 372 when the mixed flow fan 323 is driven. In any cases, the thermal effect on the throttle body 30 can be reduced effectively.

As described above, in this configuration, the exhaust air from the radiator directed toward the throttle body 30 can be reduced.

In contrast, even when the exhaust air from the radiator directed toward the throttle body 30 is reduced, if the exhaust air from the radiator or heated air from the engine 23 stays in the periphery of the throttle body 30, the heat stays in the periphery, and a thermal effect on the throttle body 30 is resulted.

In this case, if a large free space is provided in the periphery of the throttle body 30, the heat is prevented from easily staying in the periphery of the throttle body 30. However, in the automatic two-wheeled vehicle 1 in which a layout space for the components is limited, the free space as described above can hardly be secured.

In the automatic two-wheeled vehicle 1 as well, as shown in FIG. 4, a battery 162, a canister 381, and a starter motor 383 are disposed in a space SC surrounded by the throttle body 30, the air cleaner 24, the storage box 25, and the engine 23, and the space SC is used as the layout space for the components. These are relatively large components wherein heat is liable to stay in the periphery of the throttle body 30 and may occur unless otherwise arranged adequately.

Therefore, in this configuration, the disposition of the battery 162, the canister 381, and the starter motor 383 as shown below causes a hard staying of heat in the periphery of the throttle body 30.

As shown in FIG. 4, the battery 162 has a parallelepiped shape like a general battery, and is arranged so as to be inclined obliquely in a side view. More specifically, the battery 162 is disposed in a position in which a surface having terminals of the battery 162 (referred to as "terminal-side surface") 162A is positioned close to a front wall 105 of the storage box 25 positioned rearwardly and upwardly thereof, and a surface 162B opposing the terminal-side surface 162A is faced toward the throttle body 30 positioned forwardly and downwardly thereof, and an upper surface 162C thereof is positioned close to a rear lower surface 24E of the air cleaner lower case 24A.

The battery 162 is supported by the vehicle body frame 2 via the battery box 165 in the shape of a box opening on the side of the storage box 25, and a fuse box 163 is mounted in the interior of the battery box 165 at a position adjacent to the battery 162 on the side thereof. Disposed upward of the battery 162 between the air cleaner 24 and the storage box 25 is an inclination sensor 161 (see FIG. 1) configured to detect the lateral inclination of the automatic two-wheeled vehicle 1 at a position outwardly in the vehicle width direction.

The canister 381 is arranged downwardly of the battery 162 in the proximity of a bottom plate 102 of the storage box 25, and is supported at a position apart and rearwardly from the throttle body 30.

The starter motor 383 is supported on the side of the crankcase 51 so as to be arranged between the canister 381 and the crankcase 51, and is supported at a position rearwardly and downwardly apart from the throttle body 30.

In other words, as shown in FIG. 4, the battery 162, the canister 381, and the starter motor 383 are arranged vertically in a line in the proximity of the storage box 25. Accordingly, a free space SC1 extending in the vertical direction and extending in the vehicle width direction can be formed rearwardly of the throttle body 30.

In this layout, the free space SC1 can be secured in the periphery of the throttle body 30 while using the space SC rearward of the throttle body 30 as the component space, and the heat in the periphery of the throttle body 30 (the exhaust air from the radiator or the exhaust heat from the engine) can easily be discharged to the outside of the vehicle. Therefore, the heat is avoided from staying in the periphery of the throttle body 30, and the thermal effect on the throttle body 30 can be restrained sufficiently.

As described thus far, according to the embodiment, since the radiator 59 includes the mixed flow fan 323 which flows the exhaust air from the radiator rearwardly and outwardly in the vehicle width direction and the drive motor 325 is configured to rotate the mixed flow fan 323 on a back surface thereof and the throttle body 30 is arranged rearwardly of the mixed flow fan 323 so as to be overlapped with the mixed flow fan 323 as shown in FIG. 5, the exhaust air from the radiator directed toward the throttle body 30 can be restrained by the mixed flow fan 323. Therefore, even when the radiator 59 is upsized, the throttle body 30 can be arranged while restraining the effect of the exhaust air from the radiator 59.

Also, in this configuration, as shown in FIG. 6, since the engine 23 is a parallel multi-cylinder engine having the single air-inlet port 52F to which the air intake pipes (the connecting tube 61, the throttle body 30) are connected and the branch intake air passage 52R branched from the air-inlet port 52F to the plurality of cylinders, the throttle body 30 can be configured with a single cylindrical member. Therefore, the width of the throttle body 30 of the parallel multi-cylinder engine can be reduced, and the exhaust air rearward of the radiator 59 can easily flow, so that the thermal effect on the throttle body 30 can further be restrained.

As shown in FIG. 5, the radiator 59 is overlapped with the cylinder head cover 52C at a front end of the cylinder portion 52 in front view, the mixed flow fan 323 is arranged at a position offset to one side of the vehicle width center LC in the vehicle width direction, and the slant surface 372 (see FIG. 7) inclined rearwardly is provided on one side of the cylinder head cover 52C in the vehicle width direction. Therefore, even with a structure in which the cylinder head cover 52C is arranged rearwardly of the radiator 59, an ease of flow of the exhaust air from the radiator can be enhanced by the slant surface 372, whereby the thermal effect on the throttle body 30 can be restrained.

Furthermore, in this configuration, since the vane on one side of the mixed flow fan 323 in the vehicle width direction and the slant surface 372 of the cylinder head cover 52C are arranged within the same width 323W in the vehicle width direction as shown in FIG. 7, the exhaust air from the radiator can efficiently flow, whereby the thermal effect on the throttle body 30 can be restrained as well.

In this configuration, large components such as the battery 162, the canister 381, and the starter motor 383 are arranged between the throttle body 30 and the storage box 25 rearwardly of the throttle body 30 in the proximity of the storage box 25 in a line in the vertical direction as shown in FIG. 4. Therefore, the free space SC1 extending in the vertical direction and in the lateral direction can be secured rearwardly of the throttle body 30, whereby the thermal effect on the throttle body 30 due to the heat staying in the periphery of the throttle body 30 can be restrained.

Also, in this configuration, the air intake pipes having the throttle body 30 extends forwardly and upwardly obliquely from the cylinder portion 52, and the upper ends thereof are connected to the air cleaner 24 arranged upwardly of the radiator 59, so that the air intake pipes can be arranged compactly in the space surrounded by the cylinder portion 52, the radiator 59, and the air cleaner 24.

In this configuration, since the radiator 59 is arranged astride forward of the air intake pipes and forward of the cylinder portion 52 and is arranged at an angle of inclination less than the angles of inclination of the air intake pipes in side view, so that the radiator 59 can be arranged so as to use the front space between the air intake pipes and the cylinder portion 52 as much as possible, whereby the effective utilization of the space is enabled.

Since the radiator 59 is arranged upward of the line L11 extending along the front surface of the cylinder block 52A, the radiator 59 can be arranged at a position higher than the cylinder block 52A, so that the radiator 59 can hardly get wet by the water or the like from the front wheel 21.

The above-described embodiment is only for describing a mode of the present invention, and may be modified and applied arbitrarily without departing the range of the main scope of the present invention.

For example, in the above-described embodiment, a case where the present invention is applied to the automatic two-wheeled vehicle 1 having a parallel double-cylinder engine has been described. However, the present invention may also be applied to automatic two-wheeled vehicles having engines such as other types of parallel multi-cylinder engines or a single-cylinder engine.

In the above-described embodiment, a case where the present invention is applied to the automatic two-wheeled vehicle 1 shown in FIG. 1 has been described. However, the invention is not limited thereto, and is applicable widely to the saddle type vehicles. The saddle type vehicle includes general vehicles which allow riders to ride astride the vehicle bodies, and includes not only the automatic two-wheeled vehicle (including a motorcycle), but also three-wheeled vehicles or four-wheeled vehicles categorized as ATV (rough-terrain traveling vehicles).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle vehicle comprising:
a vehicle body frame having a head pipe and a main frame extending rearwardly from the head pipe;
an engine having a cylinder portion extending forward and upward obliquely from a crank case at a position downward of the main frame;
a radiator disposed in front of the cylinder portion of the engine, wherein the radiator has a width in a vehicle width direction; and
air intake pipes having a throttle body for adjusting a supply of air to the engine provided upwardly of the cylinder portion,
wherein the radiator includes a mixed flow fan for directing a flow of exhaust air from the radiator rearwardly and outwardly in the vehicle width direction and a motor for rotating the mixed flow fan disposed on a rear surface thereof,
the throttle body is arranged rearwardly of the mixed flow fan to overlap with the mixed flow fan in a front view, and
the mixed flow fan is arranged at a position offset from a center of the width of the radiator.

2. The saddle vehicle according to claim 1, wherein the engine is a parallel multi-cylinder engine having a single air-inlet port to which the air intake pipes are connected, and a branch intake air passage branched from the air-inlet port to a plurality of cylinders.

3. The saddle vehicle according to claim 2, wherein
the radiator is overlapped with a cylinder head cover at a front end of the cylinder portion in front view,
the mixed flow fan is arranged at a position offset from a vehicle width center to one side in the vehicle width direction, and a slant surface inclined rearwardly is provided on one side of the cylinder head cover in the vehicle width direction, and
the center of the width of the radiator is aligned with the vehicle width center.

4. The saddle vehicle according to claim 2, wherein the radiator is arranged upward of a line extending along a front surface of a cylinder block of the engine.

5. The saddle vehicle according to claim 1, wherein
the radiator is overlapped with a cylinder head cover at a front end of the cylinder portion in front view,
the mixed flow fan is arranged at a position offset from a vehicle width center to one side in the vehicle width direction, and a slant surface inclined rearwardly is provided on one side of the cylinder head cover in the vehicle width direction, and
the center of the width of the radiator is aligned with the vehicle width center.

6. The saddle vehicle according to claim 5, wherein a vane on the one side of the mixed flow fan in the vehicle width direction and the slant surface of the cylinder head cover are arranged within the same width in the vehicle width direction.

7. The saddle vehicle according to claim 5, wherein the radiator is arranged upward of a line extending along a front surface of a cylinder block of the engine.

8. The saddle vehicle according to claim 1, wherein the air intake pipes extend forwardly and upwardly obliquely from the cylinder portion and upper ends thereof are connected to an air cleaner arranged upward of the radiator.

9. The saddle vehicle according to claim 8, wherein the radiator is arranged astride forward of the air intake pipes and forward of the cylinder portion, and the radiator is arranged at an angle of inclination less than angles of inclination of the air intake pipes in a side view.

10. The saddle vehicle according to claim 1, wherein the radiator is arranged upward of a line extending along a front surface of a cylinder block of the engine.

* * * * *